United States Patent [19]

Tanaka et al.

[11] Patent Number: 5,535,058
[45] Date of Patent: Jul. 9, 1996

[54] FOCUS ERROR DETECTING ELEMENT AND OPTICAL HEAD USING THE SAME

[75] Inventors: Yasuhiro Tanaka, Ashiya; Michihiro Yamagata, Osaka, both of Japan

[73] Assignee: Matsushta Electric Industrial Co., Ltd., Osaka, Japan

[21] Appl. No.: 109,532

[22] Filed: Aug. 20, 1993

[30] Foreign Application Priority Data

Oct. 26, 1992 [JP] Japan .................... 4-287334
Feb. 24, 1993 [JP] Japan .................... 5-035090

[51] Int. Cl.⁶ .................................. G02B 13/18
[52] U.S. Cl. .................................. 359/711; 359/719
[58] Field of Search .................. 359/708, 711, 359/719

[56] References Cited

U.S. PATENT DOCUMENTS

| | | | |
|---|---|---|---|
| 4,027,952 | 6/1977 | Hugues | 359/719 |
| 4,501,493 | 2/1985 | Kubota | 356/123 |
| 4,504,128 | 3/1985 | Guilino et al. | 351/167 |
| 4,641,296 | 2/1987 | Mizunoe et al. | 369/46 |
| 4,900,138 | 2/1990 | Atkinson, III et al. | 359/652 |
| 4,915,484 | 4/1990 | Yamamoto | 359/668 |
| 4,938,573 | 7/1990 | Saito | 359/719 |
| 4,968,874 | 11/1990 | Kasuga | 359/711 |
| 4,986,641 | 1/1991 | Braat | 359/719 |
| 5,095,477 | 3/1992 | Shimozawa | 369/112 |

FOREIGN PATENT DOCUMENTS

| | | |
|---|---|---|
| 0286368 | 12/1988 | European Pat. Off. . |
| 61-165830 | 7/1966 | Japan . |
| 1-109317 | 4/1989 | Japan ............ 359/719 |

OTHER PUBLICATIONS

"Principles of Optical Disc Systems", Bouwhuis et al., 1985, pp. 79–80.

*Primary Examiner*—Scott J. Sugarman
*Attorney, Agent, or Firm*—Wenderoth, Lind & Ponack

[57] ABSTRACT

An optical system for detecting a focus error signal in an optical disc according to the astigmatic method is constituted by a single lens element. This lens element has a first lens surface defined by a toric surface effective to converge the incident rays of light and also to produce an astigmatism. This lens element also has a second lens surface which has a negative power so as to form a telephoto optical system, making it possible to shorten the length of the optical system.

16 Claims, 4 Drawing Sheets

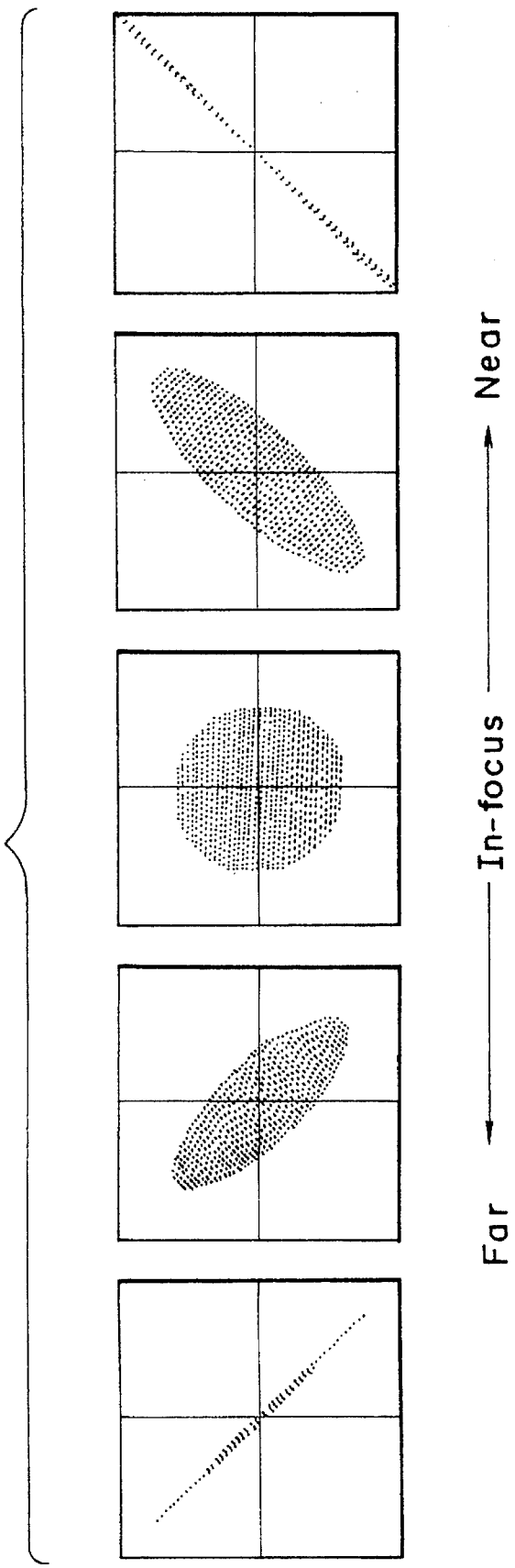

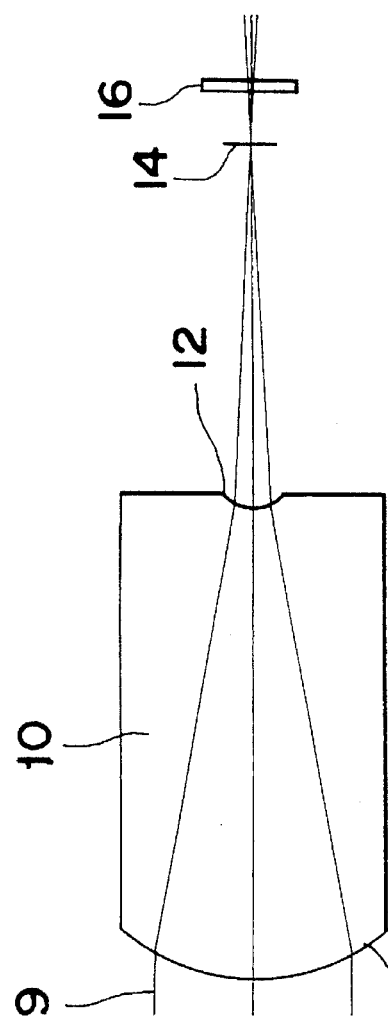
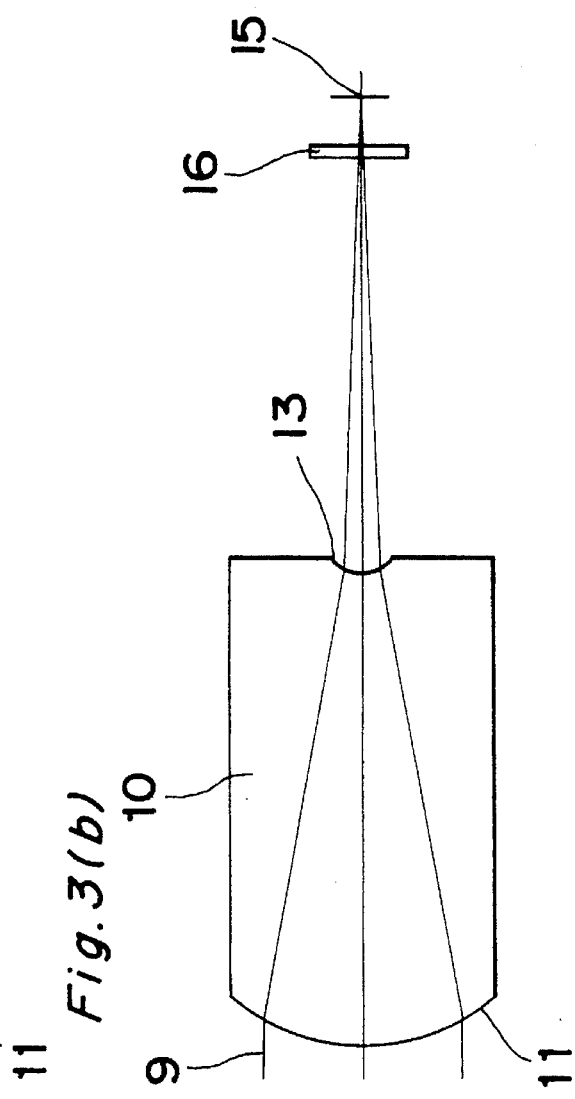

FOCUS ERROR DETECTING ELEMENT AND OPTICAL HEAD USING THE SAME

BACKGROUND OF THE INVENTION

1. Field of the Invention

The present invention relates to an optical system for an optical head used in an optical disc system and, more particularly, to a focus error detecting element for generating a focus error signal by producing an astigmatism for focusing an objective lens on an optical disc at all times.

2. Description of the Prior Art

In the optical disc system, a condensed spot of light formed by an objective lens must be focused on an information carrier surface at all times. To achieve this, it is necessary to detect any deviation of the condensed light spot from the information carrier surface so that an error if detected can be fed back to accomplish a servo control. The prior art head optical system used in the optical disc system is shown in FIG. 5.

Referring to FIG. 5 for the discussion of the prior art, rays of light emitted from a semiconductor laser 25 are converted by a collimator lens 26 into a parallel bundle of light which is subsequently converged by an objective lens 27 on the information carrier surface 29 formed on a rear surface of an optical disc substrate 28. The light modulated by the information carrier surface 29 is reflected therefrom so as to travel towards a beam splitter 30 through the objective lens 27. As the reflected light passes through the objective lens 27, it is transformed into a parallel returning beam. The beam splitter 30 deflects the returning beam so as to travel towards a photodetector 34 through a convex lens 31, then through a cylindrical lens 32 and finally through a concave lens 33. Change in distance between the objective lens 27 and the information carrier surface 29 results in a defocusing. Accordingly, once the defocusing occurs, the modulated returning beam reflected from the information carrier surface 29 does not become a parallel bundle of light after having passed through the objective lens 27, and may diverge or converge outwardly. On the other hand, an astigmatism occurs on the photodetector 34 due to the presence of the cylindrical lens 32. If the photodetector 34 is positioned intermediate of the astigmatic difference, a substantially round light spot is formed on the photodetector 34 when in an in-focus condition. However, if the light incident on the photodetector 34 is diverged or converged depending on a focus error, the spot profile on the photodetector 34 varies with the astigmatism caused by the cylindrical lens 32. By detecting a change in pattern of light distribution by means of the quadrant photodetector 34, it is possible to obtain a focus error signal. (See "Principles of Optical Disc System" by G. Bouwhuis, et al., Adam Hilger Ltd., 1985, Chap. 2, p. 79.)

Assuming that the focal length of the objective lens 27 is $f_{ob}$ and the composite focal length of an assembly of the convex and concave lenses 31 and 33 is $f_{dt}$, the sensitivity of a focus error detecting optical system is proportional to $f_{ob}^2/(f_{dt}^2 \cdot \Delta f)$, wherein $\Delta f$ represents the spacing between two focal points produced by a cylindrical surface of the cylindrical lens 32. On the other hand, the size of the light spot formed on the quadrant photodetector 24 is proportional to $f_{dt}/\Delta f$. Accordingly, since $\Delta t$ is determined if the necessary sensitivity is secured, the size of the light spot is proportional to the focal length $f_{dt}$ of the detecting optical system. If the size of the light spot falling on the quadrant photodetector 34 is too small, not only is it difficult to properly position the photodetector 34 relative to the light spot, but also the width of a gap between each neighboring photodetectors can no longer be negligible. If therefore the focal length $f_{dt}$ of the detecting optical system is chosen to be of a great value, the size of the optical system will become large making it difficult to render the optical head to be compact. The concave lens 33 is employed for eliminating the foregoing problems since it forms a part of a telephoto optical system wherein a concave and a convex lenses are employed with the convex lens located on one side of the concave lens adjacent a light source and which generally has a short optical system for a focal length.

However, with the system shown in FIG. 5, since the three lenses are necessary for the focus error detecting optical system, assemblage requires a precise adjustment, making the optical system expensive. Also, even though this is replaced with a toric surface, the concave lens is still required for the optical system to become compact and, hence, two lenses, i.e., toric and concave lenses, are required.

SUMMARY OF THE INVENTION

The present invention has for its object to provide an improved focus error detecting optical element which employs a single lens and is therefore compact in size.

To this end, the present invention employs a single lens of a structure having first and second lens surfaces with the first lens surface adjacent to and confronting a source of the incoming light, said first lens surface being a toric lens surface having a positive power while the second lens surface is a rotational symmetrical lens surface having a negative power.

According to the present invention, since the focus error detecting optical element is such that the incident light is converged by the first lens surface, i.e., the toric lens surface, which simultaneously produces an astigmatism, with the negative power of the second lens surface forming a telephoto system, the focus error detecting optical system compact in size for a given focal length can be realized.

As discussed above, the present invention makes use of the single lens having the toric lens surface of a positive power and the rotational symmetric lens surface of a negative power in the order from the source of the incident light, to provide a focus error signal according to the astigmatic method. Since the focus error detecting optical system according to the present invention has a reduced length for a given focal length and, therefore, an optical head compact in size can be realized. The use of an aspherical lens surface eliminates a spherical aberration which would occur on a photodetector, making it possible to accomplish a highly precise focus error detection while the photodetector may have a relatively large positioning tolerance.

Moreover, not only can the focus error detecting element of the present invention be precisely and accurately mass-produced by the use of a glass molding technique at a reduced, but also with it a focus error detection favorable in temperature characteristic is possible.

BRIEF DESCRIPTION OF THE DRAWINGS

This and other objects and features of the present invention will become clear from the following description taken in conjunction with preferred embodiments thereof with reference to the accompanying drawings, in which like parts are designated by like reference numerals and in which:

FIG. 2 is a diagram showing a change in pattern of the light spot on a light receiving surface with change in focus error;

FIGS. 3(a) and 3(b) are schematic diagrams showing the optical system of the focus error detecting element according to a second embodiment of the present invention;

DETAILED DESCRIPTION OF THE EMBODIMENTS

Figure 1A:
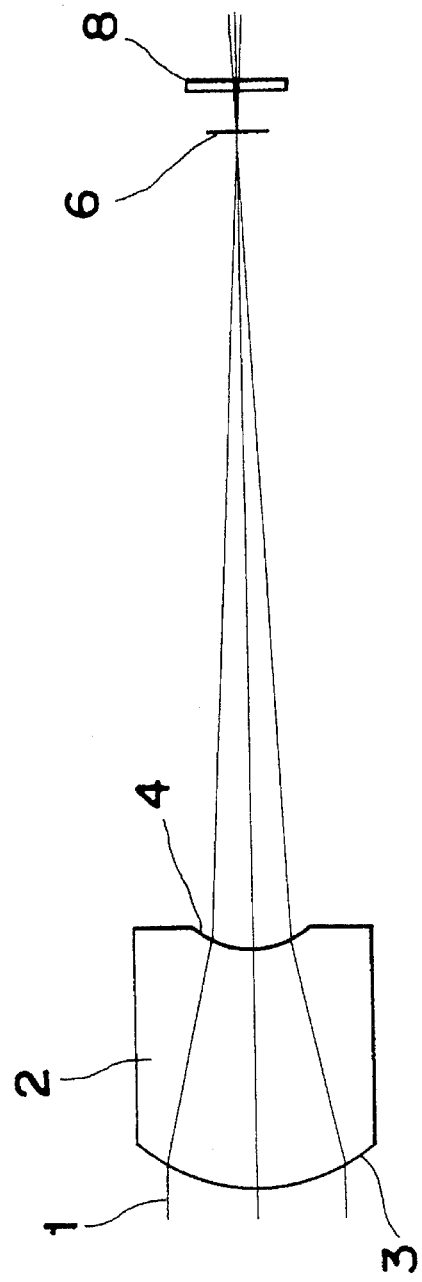
FIGS. 1(a) and 1(b) are schematic diagrams showing an optical system of a focus error detecting element according to a first embodiment of the present invention.
Figure 1B:
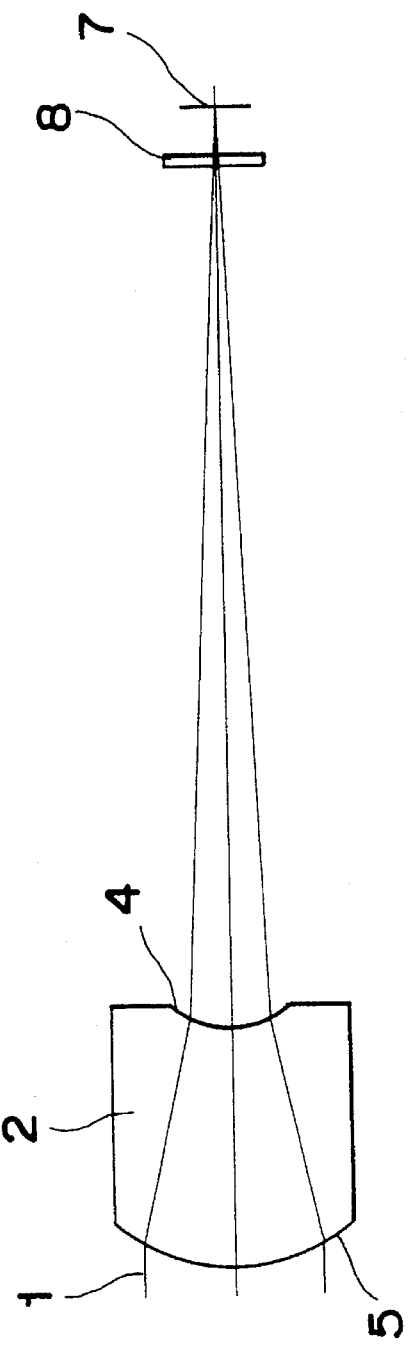

Referring now to FIG. 1, rays of light reflected from an information carrier surface and subsequently rendered to be a parallel bundle of light as indicated by 1 enter a focus error detecting element 2. In an X cross-section of this focus error detecting element 2, a first lens surface is of an asphere 3 and a second lens surface is also of an aspherical shape 4. On the other hand, in a Y cross-section, the first lens surface is of a sphere 5 and the second lens surface remains to be of the aspherical shape 4 as in the X cross-section. Accordingly, the first lens surface represents an anamorphic surface in which one cross-section of the toric surface is aspherical, and the second lens surface is rotationally symmetrically aspheric.

Since the first lens surface is an anamorphic surface, it has a different radius of curvature in the X cross-section and in the Y cross-section and, hence, has different focal points 6 and 7 in the X and Y cross-sections, respectively. Where the focal point of the objective lens does not lie on the information carrier medium, the bundle of light 1 incident on the focus error detecting element 2 will slightly diverge or converge and, therefore, the point at which the light bundle converges depart from any one of the focal points 6 and 7. A change in pattern of the light spot on a photodetector 8 disposed intermediate between the focal points 6 and 7, which takes place with a deviation of the focus of the objective lens is shown in a spot diagram of FIG. 2. As shown therein, the pattern of the light spot on the photodetector 8 varies with the magnitude of defocusing of the objective lens. A focus error signal can be obtained by detecting the change in pattern of the light spot with the photodetector 8 of a quadrant sensing system.

The aspherical surface 4, which forms the second lens surface of the focus error detecting element 2, is so designed and so shaped that a spherical aberration appearing at the focal point 7 of the spherical surface 5 forming a part of the first lens surface can be compensated for to allow the light to be uniformly distributed on the photodetector 8. On the other hand, the aspherical surface 3 forming another part of the first lens surface of the focus error detecting element 2 is so designed and so shaped as to permit a combination of the aspherical surface 3 with the aspherical surface 4 of the second lens surface to compensate for the spherical aberration appearing on the focal point 6. By so doing, both of the spherical aberrations appearing on the focal points 6 and 7, respectively, can be compensated for.

The focus error detecting element 2 of the present invention preferably satisfies the following relationship:

$$0.5 < (WD+d)/f < 0.9$$

where:

$$1/f = (1/f_1 + 1/f_2)/2, \text{ and}$$

$$1/WD = (1/WD_1 + 1/WD_2)/2$$

wherein $WD_1$ and $WD_2$ represent respective distances from two focal points produced by associated symmetrical surfaces of the toric surface, i.e., the first lens surface, which are perpendicular to each other, $f_1$ and $f_2$ represent respective focal lengths, d represents the thickness of the lens.

If the quotient of $(WD+d)/f$ exceeds the lowermost limit, the aspherical surface forming the second lens surface will fail to compensate for the spherical aberration. On the other hand, if the quotient exceeds the uppermost limit, a characteristic of the telephoto optical system will be reduced, making it difficult to render the focus error detecting optical system to be compact.

Also, the focus error detecting element 2 of the present invention preferably satisfies the following relationship;

$$0.05 < R_1/f(n-1) < 0.45$$

wherein $R_1$ represents the radius of curvature of the aspherical surface which is the toric surface forming the first lens surface, n represents the refractive index, and f represents the focal length of the aspherical surface cross section of the toric surface. If the quotient of $R_1/f(n-1)$ exceeds the lowermost limit, the radius of curvature of the second lens surface will be too small to achieve a processing. On the other hand, if the quotient exceeds from the uppermost limit, a characteristic of the telephoto optical system will be reduced, making it difficult to render the focus error detecting optical system to be compact.

Furthermore, the focus error detecting element 2 of the present invention preferably satisfies the following relationship;

$$0.8 < d(WD+d)(n-1)/f < 2.8$$

If it exceeds any one of the uppermost and lowermost limits, a correction of sine conditions will become difficult and a slight inclination of the focus error detecting element during the position adjustment will result in a coma, eventually reducing the reliability of the focus error signal.

Hereinafter, various examples of the present invention which satisfy the foregoing relationships will be demonstrated.

In these examples, the following legends are expressed by the following symbols:

Focal length: $f_{dt}$

However, if the focal length in the X cross-section and that in the Y cross-section are expressed by $f_1$ and $f_2$, respectively;

$$1/f_{dt} = (1/f_1 + 1/f_2)/2$$

Diameter of Parallel Bundle of Light: $\phi$EFF

Working Distance: WD

However, if the working distance in the X cross-section and that in the Y cross-section are expressed by $WD_1$ and $WD_2$, respectively;

$$1/WD = (1/WD_1 + 1/WD_2)/2$$

Radius of Curvature of the j-th Surface: $R_j$

Lens Thickness: d

Refractive Index of Lens: n

The design wavelength is 785 nm.

The aspherical surface of the first lens surface in the X cross-section is determined by the following equation:

$$z = \frac{\frac{X^2}{R}}{1+\sqrt{1-(K+1)\frac{X^2}{R^2}}} + AD_1X^4 + AE_1X^6 + AF_1X^8 + AG_1X^{10}$$

wherein:
- z: Distance between the plane in which the apex of the aspherical surface and a point on the aspherical surface spaced a height of X from the optical axis contacts,
- X: Height from the optical axis,
- $K_1$: Conic constant
- $AD_1, AE_1, AF_1$ and $AG_1$: 4-the, 6th, 8-th and 10-th order aspherical coefficients, and
- CVY: Curvature of the Y cross-section.

The aspherical surface of the second lens surface in the X cross-section, which is the rotationally symmetrical aspherical surface, is determined by the following equation:

$$z = \frac{\frac{p^2}{R}}{1+\sqrt{1-(K+1)\frac{p^2}{R^2}}} + AD_2p^4 + AE_2p^6 + AF_2p^8 + AG_2p^{10}$$

wherein:
$p^2 = X^2 + Y^2$
- z: Distance between the plane in which the apex of the aspherical surface and a point on the aspherical surface spaced a height of p from the optical axis contacts,
- $K_2$: Conic constant, and
- $AD_2, AE_2, AF_2$ and $AG_2$: 4-th, 6th, 8-th and 10-th order aspherical coefficients.

EXAMPLE 1

$f_{di}$=31.600
$\phi$EFF=3
WD=14.685
$R_1$=3.00
$R_2$=1.63004
d=4.0
n=1.67473
$K_1$=−0.1713000×10$^{-1}$
$AD_1$=−0.3875290×10$^{-4}$
$AE_1$=0.1046910×10$^{-4}$
$AF_1$=−0.7166867×10$^{-5}$
$AG_1$=−0.1477903×10$^{-5}$
CVY=0.3308172
$K_2$=0.4478535
$AD_2$=0.1487395×10$^{-4}$
$AE_2$=0.1487395×10$^{-1}$
$AF_2$=−0.2738604×10$^{-2}$
$AG_2$=0.2048760×10$^{-1}$

EXAMPLE 2

$f_{di}$=30.988
$\phi$EFF=3
WD=24.787
$R_1$=4.00
$R_2$=1.63004
d=2.00
n=1.67473
$K_1$=−0.8050141×10$^{-2}$
$AD_1$=−0.2203695×10$^{-4}$
$AE_1$=−0.1084451×10$^{-5}$
$AF_1$=−0.6811355×10$^{-7}$
$AG_1$=−0.1541943×10$^{-8}$
CVY=0.2473791
$K_2$=0.3021952
$AD_2$=0.7479430×10$^{-3}$
$AE_2$=0.5576422×10$^{-4}$
$AF_2$=0.4077495×10$^{-5}$
$AG_2$=0.5354332×10$^{-6}$

EXAMPLE 3

$f_{di}$=31.162
$\phi$EFF=3
WD=19.112
$R_1$=5.20
$R_2$=4.80194
d=6.0
n=1.51062
$K_1$=−0.2005790×10$^{-1}$
$AD_1$=−0.2194097×10$^{-4}$
$AE_1$=−0.5704753×10$^{-6}$
$AF_1$=−0.1821633×10$^{-7}$
$AG_1$=−0.9108300×10$^{-10}$
CVY=0.1888844
$K_2$=0.1026386×10$^{+1}$
$AD_2$=0.1276237×10$^{-2}$
$AE_2$=0.1127486×10$^{-3}$
$AF_2$=0.1058971×10$^{-4}$
$AG_2$=0.1507675×10$^{-5}$

EXAMPLE 4

$f_{di}$=31.667
$\phi$EFF=3
WD=14.304
$R_1$=2.80
$R_2$=1.43036
d=3.50
n=1.78537
$K_1$=−0.2118540×10$^{-1}$
$AD_1$=0.3929928×10$^{-5}$
$AE_1$=0.2777817×10$^{-4}$
$AF_1$=−0.1397035×10$^{-4}$
$AG_1$=0.3117647×10$^{-5}$
CVY=0.3549910
$K_2$=0.4387882
$AD_2$=0.1415121×10$^{-1}$
$AE_2$=0.1974914×10$^{-1}$
$AF_2$=−0.1327082×10$^{-1}$
$AG_2$=0.4749120×10$^{-1}$ FIG. 3 illustrates the focus error detecting element according to another embodiment of the present invention. As shown therein, rays of light reflected from an information carrier surface and subsequently rendered to be a parallel bundle of light as indicated by 9 enter a focus error detecting element 10. In an X cross-section of this focus error detecting element 10, a first lens surface is of an aspherical shape 11 and a second lens surface is also of an aspherical shape 12. On the other hand, in a Y cross-section, the first lens surface remains to be of an aspherical shape 11 as in the X cross-section and the second lens surface is of a spherical shape 12. Accordingly, the first lens surface 11 is rotationally symmetrically aspheric and the first lens surface 13 represents an anamorphic surface in which one cross-section of the toric surface is aspherical.

Since the respective radius of curvature of the second lens surface in the X and Y cross-sections are so designed and so chosen as to differ slightly from each other, the first and second lens surfaces have different focal points 14 and 15 in the X and Y cross-sections, respectively. Where the focal point of the objective lens does not lie on the information carrier medium, the bundle of light 9 incident on the focus error detecting element 10 will slightly diverge or converge and, therefore, the point at which the light bundle converges depart from any one of the focal points 14 and 15. A focus error signal can thus be obtained by detecting the change in pattern of the light spot with the photodetector 16 of a quadrant sensing system.

The spherical surface 11, which forms the first lens surface of the focus error detecting element 10, is so designed and so shaped relative to the spherical surface 13 forming a part of the second lens surface that a spherical aberration appearing at the focal point 15 can be compensated for. On the other hand, the aspherical surface 12 forming another part of the second lens surface of the focus error detecting element 10 is so designed and so shaped as to permit a combination of the aspherical surface 12 with the aspherical surface 11 of the first lens surface to compensate for the spherical aberration appearing on the focal point 14. By so doing, both of the spherical aberrations appearing on the focal points 14 and 15, respectively, can be compensated for.

The focus error detecting element 10 according to the alternative embodiment of the present invention preferably satisfies the following relationship:

$$0.2 < (WD+d)/f < 0.9$$

where:

$$1/f = (1/f_1 + 1/f_2)/2, \text{ and}$$

$$1/WD = (1/WD_1 + 1/WD_2)/2$$

wherein $WD_1$ and $WD_2$ represent respective distances from two focal points produced by associated symmetrical surfaces of the toric surface, i.e., the second lens surface, which are perpendicular to each other, $f_1$ and $f_2$ represent respective focal lengths, d represents the thickness of the lens.

If the quotient of (WD+d)/f exceeds the lowermost limit, the aspherical surface forming the first lens surface will fail to compensate for the spherical aberration. On the other hand, if the quotient exceeds the uppermost limit, a characteristic of the telephoto optical system will be reduced, making it difficult to render the focus error detecting optical system to be compact.

Also, the focus error detecting element 10 of the present invention preferably satisfies the following relationship;

$$0.05 < R_1/f(n-1) < 0.3$$

wherein $R_1$ represents the radius of curvature of the aspherical surface which is the toric surface forming the first lens surface, n represents the refractive index, and f represents the focal length of the aspherical surface cross section of the toric surface. If the quotient of $R_1/f(n-1)$ exceeds the lowermost limit, the radius of curvature of the second lens surface will be too small to achieve a processing. On the other hand, if the quotient exceeds from the uppermost limit, a characteristic of the telephoto optical system will be reduced, making it difficult to render the focus error detecting optical system to be compact.

Furthermore, the focus error detecting element 10 of the present invention preferably satisfies the following relationship;

$$0.8 < d(WD+d)(n-1)/f < 2.8$$

If it exceeds any one of the uppermost and lowermost limits, a correction of sine conditions will become difficult and a slight inclination of the focus error detecting element during the position adjustment will result in a coma, eventually reducing the reliability of the focus error signal.

Hereinafter, various examples of the present invention which satisfy the foregoing relationships will be demonstrated.

In these examples, the following legends are expressed by the following symbols:

Focal length: $f_{dt}$

However, if the focal length in the X cross-section and that in the Y cross-section are expressed by $f_1$ and $f_2$, respectively;

$$1/f_{dt} = (1/f_1 + 1/f_2)/2$$

Diameter of Parallel Bundle of Light: $\phi EFF$

Operating Distance: WD

However, if the operating distance in the X cross-section and that in the Y cross-section are expressed by $WD_1$ and $WD_2$, respectively;

$$1/WD = (1/WD_1 + 1/WD_2)/2$$

Radius of Curvature of the j-the Surface: $R_j$

Lens Thickness: d

Refractive Index of Lens: n

The design wavelength is 785 nm.

The asphericity of the first lens surface in the X cross-section is determined by the following equation:

$$z = \frac{\frac{p^2}{R}}{1 + \sqrt{1 - (K+1)\frac{p^2}{R^2}}} + AD_1 p^4 + AE_1 p^6 + AF_1 p^8 + AG_1 p^{10}$$

wherein:

$p^2 = X^2 + Y^2$ z: Distance between the plane in which the apex of the aspherical surface and a point on the aspherical surface spaced a height of p from the optical axis contacts, $K_1$: Conic constant $AD_1, AE_1, AF_1$ and $AG_1$: 4-th, 6-th, 8-th and 10-th order aspherical coefficients.

The aspherical surface of the second lens surface in the X cross-section is determined by the following equation:

$$z = \frac{\frac{X^2}{R}}{1+\sqrt{1-(K+1)\frac{X^2}{R^2}}} +$$

$$AD_2X^4 + AE_2X^6 + AF_2X^8 + AG_2X^{10}$$

z: Distance from the plane in which the apex of the aspherical surface at a point on the aspherical surface spaced a height of Y from the optical axis contacts, X: Height from the optical axis, $K_2$: Conic constant, and $AD_2$, $AE_2$, $AF_2$ and $AG_2$: 4-th, 6-th, 8-th and 10-th order aspherical coefficients.

CVY: Curvature of the Y cross-section.

EXAMPLE 5

$f_{dt}$=32.117
$\phi$EFF=3
WD=11.984
$R_1$=2.65
$R_2$=1.12926
d=4.0
n=1.71026
$K_1$=−0.1104228
$AD_1$=−0.1158928×10$^{-3}$
$AE_1$=−0.1445470×10$^{-3}$
$AF_1$=−0.3851351×10$^{-5}$
$AG_1$=−0.4369094×10$^{-5}$
$K_2$=0.2335549
$AD_2$=0.8920485×10$^{-3}$
$AE_2$=−0.3250252×10$^{-2}$
$AF_2$=0.1659971×10$^{-1}$
$AG_2$=−0.2306803×10$^{-1}$
CVY=0.9021158

EXAMPLE 6

$f_{dt}$=34.066
$\phi$EFF=3
WD=6.158
$R_1$=2.90
$R_2$=0.65222
d=7.20
n=1.49248
$K_1$=−0.1726124
$AD_1$=−0.1243311×10$^{-2}$
$AE_1$=−0.1137175×10$^{-3}$
$AF_1$=−0.2835593×10$^{-5}$
$AG_1$=−0.1844569×10$^{-5}$
$K_2$=0.1980265
$AD_2$=−0.4046773×10$^{-1}$
$AE_2$=−0.1725523
$AF_2$=0.0
$AG_2$=0.0
CVY=0.1622616×10$^{+1}$

EXAMPLE 7

$f_{dt}$=31.173
$\phi$EFF=3
WD=21.697
$R_1$=3.00
$R_2$=2.52827
d=2.5
n=1.57428
$K_1$=−0.1459562
$AD_1$=−0.7564345×10$^{-3}$
$AE_1$=−0.6187928×10$^{-4}$
$AF_1$=−0.3751770×10$^{-5}$
$AG_1$=−0.7469007×10$^{-6}$
$K_2$=0.1809195×10$^{-1}$
$AD_2$=0.5705348×10$^{-4}$
$AE_2$=0.2871857×10$^{-5}$
$AF_2$=0.7066748×10$^{-5}$
$AG_2$=0.2475722×10$^{-5}$
CVY=0.4018057

EXAMPLE 8

$f_{dt}$=31.227
$\phi$EFF=3
WD=20.759
$R_1$=2.28
$R_2$=1.68980
d=1.8
n=1.73786
$K_1$=−0.1929328×10$^{-3}$
$AD_1$=−0.3002341×10$^{-3}$
$AE_1$=−0.3949699×10$^{-4}$
$AF_1$=0.3343833×10$^{-6}$
$AG_1$=−0.2004097×10$^{-5}$
$K_2$=0.3640967×10$^{-1}$
$AD_2$=−0.5395745×10$^{-3}$
$AE_2$=−0.2681155×10$^{-3}$
$AF_2$=0.3753713×10$^{-4}$
$AG_2$=−0.9786757×10$^{-4}$
CVY=0.5971229

EXAMPLE 9

$f_{dt}$=32.705
$\phi$EFF=3
WD=9.347
$R_1$=2.25
$R_2$=0.70176
d=3.4
n=1.89623
$K_1$=−0.2321354
$AD_1$=−0.1289327×10$^{-2}$
$AE_1$=−0.6030017×10$^{-6}$
$AF_1$=−0.5330987×10$^{-7}$
$AG_1$=−0.8095291×10$^{-8}$
$K_2$=0.2103020×10$^{-1}$
$AD_2$=0.1391917×10$^{-2}$
$AE_2$=0.1309584×10$^{-2}$
$AF_2$=0.1320272×10$^{-2}$
$AG_2$=0.9380020×10$^{-3}$
CVY=0.1446525

EXAMPLE 10

$f_{dt}=34.534$
$\phi EFF=3$
$WD=7.100$
$R_1=4.057$
$R_2=0.985$
$d=8.0$
$n=1.67293$
$K_1=-0.3381690$
$AD_1=-0.9160915\times10^{-5}$
$AE_1=-0.2016442\times10^{-6}$
$AF_1=-0.4610659\times10^{-8}$
$AG_1=-0.1733891\times10^{-9}$
$K_2=-0.5173224\times10^{-1}$
$AD_2=-0.3685024\times10^{-2}$
$AE_2=-0.3478071\times10^{-2}$
$AF_2=-0.2739039\times10^{-2}$
$AG_2=-0.4175221\times10^{-2}$
$CVY=0.9522743$

EXAMPLE 11

$f_{dt}=45.584$
$\phi EFF=3$
$WD=3.500$
$R_1=3.278$
$R_2=0.275$
$d=7.5$
$n=1.67293$
$K_1=-0.3352776$
$AD_1=-0.4891159\times10^{-5}$
$AE_1=-0.2884040\times10^{-5}$
$AF_1=-0.1165152\times10^{-6}$
$AG_1=-0.1812497\times10^{-7}$
$K_2=0.1585410\times10^{-1}$
$AD_2=-0.1160176\times10^{+1}$
$AE_2=-0.1433568\times10^{+2}$
$AF_2=-0.7639761\times10^{+2}$
$AG_2=-0.4292383\times10^{+4}$
$CVY=3.2072873$

EXAMPLE 12

$f_{dt}=36.493$
$\phi EFF=3$
$WD=9.500$
$R_1=2.723$
$R_2=0.788$
$d=5.0$
$n=1.67293$
$K_1=-0.3156623$
$AD_1=-0.2255406\times10^{-4}$
$AE_1=-0.6897670\times10^{-6}$
$AF_1=-0.2864539\times10^{-7}$
$AG_1=-0.1737668\times10^{-8}$
$K_2=-0.4359494\times10^{-1}$
$AD_2=-0.1839847\times10^{-2}$
$AE_2=-0.1467300\times10^{-2}$
$AF_2=-0.1103593\times10^{-2}$
$AG_2=-0.1169886\times10^{-2}$
$CVY=1.230243$

EXAMPLE 13

$f_{dt}=32.905$
$\phi EFF=3$
$WD=11.463$
$R_1=2.700$
$R_2=1.0384$
$d=4.0$
$n=1.78537$
$K_1=-0.2215763$
$AD_1=-0.3024613\times10^{-3}$
$AE_1=-0.3617484\times10^{-4}$
$AF_1=-0.8311590\times10^{-6}$
$AG_1=-0.1002066\times10^{-5}$
$K_2=0.6560873\times10^{-1}$
$AD_2=-0.1093289\times10^{-1}$
$AE_2=-0.1376520\times10^{-1}$
$AF_2=-0.6680648\times10^{-2}$
$AG_2=-0.3397097\times10^{-1}$
$CVY=1.214692$

EXAMPLE 14

$f_{dt}=36.515$
$\phi EFF=3$
$WD=7.500$
$R_1=3.549$
$R_2=0.8808$
$d=7.0$
$n=1.67293$
$K_1=-0.3209675$
$AD_1=-0.1502002\times10^{-4}$
$AE_1=-0.5667526\times10^{-6}$
$AF_1=-0.2117580\times10^{-7}$
$AG_1=-0.2219057\times10^{-8}$
$K_2=0.8799912\times10^{-1}$
$AD_2=-0.2633023\times10^{-3}$
$AE_2=-0.1159465\times10^{-2}$
$AF_2=-0.1595099\times10^{-2}$
$AG_2=-0.8151816\times10^{-2}$
$CVY=1.198303$ According to the present invention, with the use of a glass molding method, the focus error detecting element of the present invention can be manufactured with high precision and at a low cost. Since a change in focal length with change in temperature is minimum as compared with that made of plastics, the focus error detecting element capable of providing a focus error signal which does not substantially vary with change in temperature can be obtained.

Figure 4:
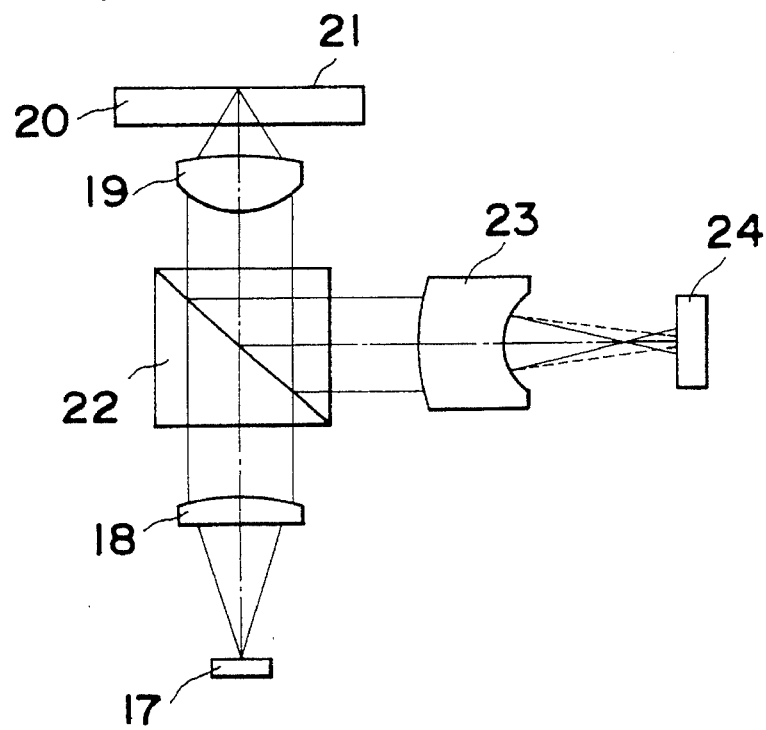
FIG. 4 is a schematic diagram showing an optical head assembly utilizing the focus error detecting element of the present invention.
Figure 5:
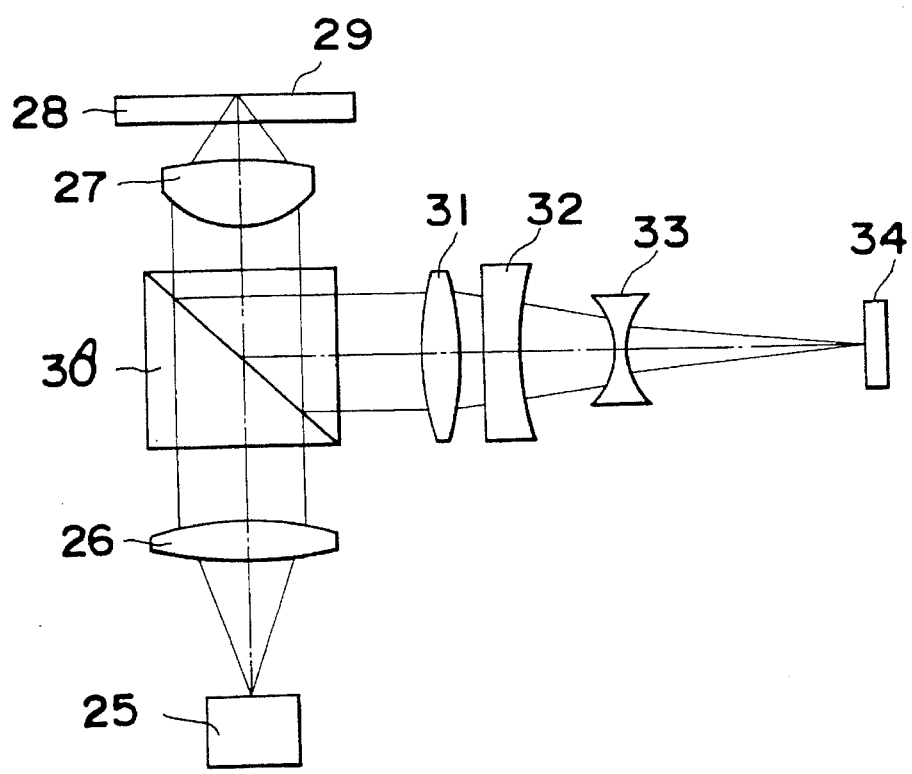
FIG. 5 is a schematic diagram showing the optical head assembly utilizing the prior art focus error detecting system.

Referring now to FIG. 4, there is shown an optical head assembly utilizing the focus error detecting element of the structure described hereinbefore. As shown therein, rays of light emitted from a semiconductor laser 17 are converted by a collimator lens 18 into a parallel bundle of light which is subsequently converged by an objective lens 19 on an information carrier surface 21 formed on a rear surface of an optical disc substrate 20. The light modulated by the information carrier surface 21 is reflected therefrom so as to travel towards a beam splitter 22 through the objective lens 19. As the reflected light passes through the objective lens 19, it is transformed into a parallel returning beam. The beam splitter 22 deflects the returning beam so as to travel towards a photodetector 24 through the focus error detecting element identified by 23, thereby forming a light spot on the photodetector 24. Since the focus error detecting element 23 has two focal points formed by the toric surface, the photodetector 24 is so positioned as to permit its light receiving surface to lie intermediate between these focal points.

In this arrangement, if the point at which the rays of light condensed by the objective lens 19 converge deviates from the information carrier surface 21, the returning beam reflected from the information carrier surface 21 does not become a parallel light even though they have passed through the objective lens 19, but diverge or converge as they emerge outwardly from the objective lens 19. In the event that the parallel light falls on the photodetector 24, a substantially round light spot is formed on the photodetector 24. However, when the returning light incident on the photodetector 24 converge or diverge as a result of a focus error, the light spot formed on the photodetector 24 represents a pattern varying depending on the astigmatism produced by the focus error detecting element 23. Therefore, if the photodetector 24 is employed in the form of a quadrant photodetector having four divided photodetectors, an electric signal descriptive of the pattern of the light falling on the photodetector 24 can be extracted as a focus error signal.

Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A focus error detecting element which comprises a single lens element having first and second lens surfaces which are close to and remote from a source of incoming light, said first lens surface being a toric surface having a positive power while said second lens surface is a rotational symmetrical surface having a negative power, wherein said single lens element satisfies the following relationship:

$$0.5<(WD+d)/f<0.9$$

wherein $1/f+(1/f_1+1/f_2)/2$ and $1/WD=(1/WD_1+1/WD_2)/2$, and wherein $WD_1$ and $WD_2$ represent respective distances from two focal points produced by the toric surface to the second lens surface, $f_1$ and $f_2$ represent respective focal lengths, and d represents the thickness of the lens element.

2. The focus error detecting element as claimed in claim 1, wherein the rotational symmetric surface having the negative power, which forms said second lens surface is an aspherical surface.

3. The focus error detecting element as claimed in claim 1, wherein at least one of sectional shapes of the toric surface forming said first lens surface, which lie in a corresponding cross-section lying on two symmetrical planes perpendicular to each other is aspherical.

4. The focus error detecting element as claimed in claim 3, wherein the rotational symmetric surface having the negative power, which forms said second lens surface is an aspherical surface.

5. A focus error detecting element which comprises a single lens element having first and second lens surfaces which are close to and remote from a source of incident light, said first lens surface being a toric surface having a positive power while said second lens surface is a rotational symmetrical surface having a negative power, wherein the single lens element satisfies the following relationship:

$$0.05<R_1/\{f\cdot(n-1)\}<0.45$$

wherein $1/f=(1/f_1+1/f_2)/2$, $f_1$ and $f_2$ represent respective focal lengths, $R_1$ represents the radius of curvature of the first lens surface lying in one cross-section and n represents a refractive index thereof.

6. A focus error detecting element which comprises a single lens element having first and second lens surfaces which are close to and remote from a source of incident light, said first lens surface being a toric surface having a positive power while said second lens surface is a rotational symmetrical surface having a negative power, wherein the single lens element satisfies the following relationship:

$$0.8<d(WD+d)(n-1)/f<2.8$$

wherein $1/f=(1/f_1+1/f_2)/2$ and $1/WD=(1/WD_1=1/WD_2)/2$, and wherein $WD_1$ and $WD_2$ represent respective distances from two focal points produced by the toric surface to the second lens surface, $f_1$ and $f_2$ represent respective focal lengths, d represents the thickness of the lens element, and n represents a refractive index thereof.

7. The focus error detecting element as claimed in claims 1 or 3 or 5 or 6, wherein said single lens element is a molded one-piece glass lens.

8. An optical head assembly which comprises:
    a light source;
    a collimating means for converting rays of light emitted from the light source into a substantially parallel light;
    a light collecting means for collecting the parallel light on an information carrier medium;
    a light splitting means for splitting the light which has been modulated by the information carrier medium;
    a focus error detecting element which comprises a single lens element having first and second lens surfaces which are close to and remote from said light source, said first lens surface being a toric surface having a positive power while said second lens surface is a rotational symmetrical surface having a negative power;
    a light receiving means for receiving the light modulated by the information carrier medium.

9. A focus error detecting element which comprises a single lens element having first and second lens surfaces which are close to and remote from a source of incoming light, said first lens surface being a rotational symmetrical surface having a positive power while said second lens surface is a toric surface having a negative power, wherein said single lens element satisfies the following relationship:

$$0.2<(WD+d)/f<0.9$$

wherein $1/f+(1/f_1+1/f_2)/2$ and $1/WD=(1/WD_1+1/WD_2)/2$, and wherein $WD_1$ and $WD_2$ represent respective distances from two focal points produced by the toric surface to the second lens surface, $f_1$ and $f_2$ represent respective focal lengths, and d represents the thickness of the lens element.

10. The focus error detecting element as claimed in claim 9, wherein the rotational symmetric surface having the positive power, which forms said first lens surface is an aspherical surface.

11. The focus error detecting element as claimed in 9, wherein at least one of sectional shapes of the toric surface forming said second lens surface, which lie in a corresponding cross-section lying on two symmetrical planes perpendicular to each other is aspherical.

12. The focus error detecting element as claimed in claims 9 or 11, wherein a rotational symmetric surface forming said first lens surface is aspherical having a aspherical aberration having been corrected relative to one of sectional shapes of the toric surface, forming the second lens surface, which is spherical, said sectional shapes lying in two symmetrical plane perpendicular to each other.

13. A focus error detecting element which comprises a single lens element having first and second lens surfaces which are close to and remote from a source of incoming light, said first lens surface being a rotational symmetrical surface having a positive power while said second lens surface is a toric surface having a negative power, wherein the single lens element satisfies the following relationship:

$$0.5 < R_1/\{f \cdot (n-1)\} < 0.3$$

wherein $1/f = (1/f_1 + 1/f_2)/2$, $f_1$ and $f_2$ represent respective focal lengths, $R_1$ represents the radius of curvature of the first lens surface lying in one cross-section and $n$ represents a refractive index thereof.

14. A focus error detecting element which comprises a single lens element having first and second lens surfaces which are close to and remote from a source of incoming light, said first lens surface being a rotational symmetrical surface having a positive power while said second lens surface is a toric surface having a negative power, wherein the single lens element satisfies the following relationship:

$$0.8 < d(WD+d)(n-1)/f < 2.8$$

wherein $1/f = (1/f_1 + 1/f_2)/2$ and $1/WD = (1/WD_1 + 1/WD_2)/2$, and wherein $WD_1$ and $WD_2$ represent respective distances from two focal points produced by the toric surface to the second lens surface, $f_1$ and $f_2$ represent respective focal lengths, $d$ represents the thickness of the lens element, and $n$ represents a refractive index thereof.

15. The focus error detecting element as claimed in claims 9 or 11 or 13 or 14, wherein said single lens element is a molded one-piece glass lens.

16. An optical head assembly which comprises:
  a light source;
  a collimating means for converting rays of light emitted from the light source into a substantially parallel light;
  a light collecting means for collecting the parallel light on an information carrier medium;
  a light splitting means for splitting the light which has been modulated by the information carrier medium; and
  a focus error detecting element which comprises a single lens element having first and second lens surfaces which are close to and remote from a source of incoiming light, said first lens surface being a rotational symmetrical surface having a positive power while said second lens surface is a toric surface having a negative power.

* * * * *